(12) United States Patent
Leemet et al.

(10) Patent No.: US 9,948,790 B2
(45) Date of Patent: *Apr. 17, 2018

(54) COST ALLOCATION FOR DERIVED DATA USAGE

(71) Applicants: Jaan Leemet, Aventura, FL (US); Paul Schmidt, Rocky Hill, CT (US); Albert R. Subbloie, Jr., Orange, CT (US); Christopher J. DeBenedictis, Branford, CT (US)

(72) Inventors: Jaan Leemet, Aventura, FL (US); Paul Schmidt, Rocky Hill, CT (US); Albert R. Subbloie, Jr., Orange, CT (US); Christopher J. DeBenedictis, Branford, CT (US)

(73) Assignee: Tangoe, Inc., Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,728

(22) Filed: Feb. 27, 2017

(65) Prior Publication Data

US 2017/0180566 A1 Jun. 22, 2017

Related U.S. Application Data

(63) Continuation of application No. 14/886,572, filed on Oct. 19, 2015, now Pat. No. 9,584,672, which is a (Continued)

(51) Int. Cl.
*H04M 15/00* (2006.01)
*H04W 4/24* (2018.01)

(52) U.S. Cl.
CPC ......... *H04M 15/781* (2013.01); *H04M 15/41* (2013.01); *H04M 15/43* (2013.01); *H04M 15/8214* (2013.01); *H04W 4/24* (2013.01)

(58) Field of Classification Search
CPC .. H04M 15/00; H04M 15/172; H04M 15/745; H04M 15/7652; H04M 15/88;
(Continued)

(56) References Cited

U.S. PATENT DOCUMENTS 6,377,993 B1 4/2002 Brandt et al.
6,381,632 B1 4/2002 Lowell
(Continued)

FOREIGN PATENT DOCUMENTS

EP 2680145 A2 1/2014
WO 2010099560 A1 9/2010

OTHER PUBLICATIONS

Cisco ASR 5000 Series Enchanced Charging Services Administration Guide Last Updated Jun. 30, 2010, 84 pages.
(Continued)

*Primary Examiner* — Binh Kien Tieu
(74) *Attorney, Agent, or Firm* — St. Onge Steward Johnston & Reens, LLC

(57) ABSTRACT

A system and method that allows for information relating to data and communication resource usage to be gathered and analyzed such that particular data transactions and usage can be classified based on purpose and/or type. Further, the system and method provide reporting based on amount of usage and/or purpose or type of usage so that associated costs and usage can be calculated applied and allocated to particular accounts, divisions, groups or individuals within and outside of a company or entity. Further, the system may restrict data usage of devices to data usage that can be allocated to particular accounts based on purpose, source, destination or other.

21 Claims, 9 Drawing Sheets

Related U.S. Application Data continuation-in-part of application No. 14/263,756, filed on Apr. 28, 2014, now Pat. No. 9,191,523.

(58) Field of Classification Search
CPC .............. G06Q 10/103; G06Q 20/322; G06Q 20/3224; G06Q 20/405; G06Q 30/0273
USPC ..... 379/111, 112.07, 112.08, 114.01, 114.03, 379/114.05, 114.06, 114.07, 114.12, 379/114.15, 114.2, 114.22, 115.01, 379/121.01, 121.03, 121.04, 121.05, 124; 370/352–365
See application file for complete search history.

(56) References Cited

U.S. PATENT DOCUMENTS

| | | |
|---|---|---|
| 6,795,856 B1 | 9/2004 | Bunch |
| 7,012,529 B2 | 3/2006 | Sajkowsky |
| 7,222,293 B1 | 5/2007 | Zapiec et al. |
| 7,584,227 B2 | 9/2009 | Gokhale et al. |
| 7,783,604 B1 | 8/2010 | Yueh |
| 7,877,362 B2 | 1/2011 | Gokhale et al. |
| 7,962,120 B2 | 6/2011 | Cai et al. |
| 8,166,554 B2 | 4/2012 | John |
| 8,538,379 B1 | 9/2013 | Stachiw et al. |
| 8,925,036 B2 | 12/2014 | Pramod |
| 9,191,523 B1 * | 11/2015 | Leemet .............. H04M 15/43 |
| 9,584,672 B2 * | 2/2017 | Leemet .............. H04M 15/43 |
| 2004/0039809 A1 | 2/2004 | Ranous et al. |
| 2005/0282559 A1 | 12/2005 | Erskine et al. |
| 2006/0195556 A1 | 8/2006 | Shamia et al. |
| 2007/0081471 A1 | 4/2007 | Talley, Jr. et al. |
| 2007/0270123 A1 | 11/2007 | Cai et al. |
| 2008/0205400 A1 | 8/2008 | Ramalho |
| 2008/0244061 A1 | 10/2008 | Kime |
| 2009/0203352 A1 | 8/2009 | Fordon et al. |
| 2009/0271324 A1 | 10/2009 | Jandhyala et al. |
| 2010/0094803 A1 | 4/2010 | Yamakawa et al. |
| 2012/0087319 A1 | 4/2012 | Raleigh et al. |
| 2012/0215911 A1 | 8/2012 | Raleigh et al. |
| 2012/0226808 A1 | 9/2012 | Morgan |
| 2013/0054378 A1 | 2/2013 | Hao et al. |
| 2014/0004820 A1 | 1/2014 | Zackrisson |
| 2014/0038546 A1 | 2/2014 | Neal et al. |
| 2014/0059056 A1 | 2/2014 | Chaney et al. |
| 2014/0066008 A1 * | 3/2014 | Ingino ............... H04M 15/43 455/408 |
| 2014/0279454 A1 | 9/2014 | Raman et al. |
| 2015/0012963 A1 * | 1/2015 | Gupta .................. H04L 63/20 726/1 |
| 2015/0109967 A1 * | 4/2015 | Hogan ............... H04W 76/022 370/259 |
| 2015/0312127 A1 * | 10/2015 | Leemet ............. H04L 41/5032 709/224 |
| 2015/0312421 A1 * | 10/2015 | Leemet ............... H04M 15/43 379/114.03 |
| 2015/0312422 A1 * | 10/2015 | Leemet ............... H04L 41/082 455/406 |

OTHER PUBLICATIONS

Nassif et al., Measuring the Usage of SAAS Applications Based On Utilized Features, Proceedings of the 1st International Conference on Cloud Computing and Services Science, Jan. 1, 2011, 8 pages.

Lindner, et al., The Cloud Supply Chain: A Framework for Information, Monitoring, Accounting and Billing, CloudComp Oct. 25, 2010, 2nd International ICST Conference on Cloud Computing, Barcelona, Spain, 22 pages.

* cited by examiner

COST ALLOCATION FOR DERIVED DATA USAGE

FIELD OF THE INVENTION

The invention relates to a system and method for determining usage patterns relating to a data communications network, and more particularly, to an analysis of data collected in connection with data communications enabling the data to be correlated to usage transactions with applications or activities to see what data is being transmitted and how, further the system relates to reporting on data usage and cost reporting and allocation based on the data usage.

BACKGROUND OF THE INVENTION

Data utilization continues to increase exponentially with the proliferation of mobile devices including, for example, mobile phones, tablet devices, laptop computers and wearable technology. Faster and wider reaching networks allow for increasing use of bandwidth intensive applications. In addition to the increased use of mobile devices, other devices and systems are increasing data usage. For example, smart cars, smart homes and smart appliances consume data with machine to machine (M2M) communication systems as the breadth and scope of available applications increases.

But the proliferation of smart devices and systems is not the only reason that data usage has dramatically increased. The manner and the frequency which smart devices are utilized by individuals have also dramatically increased. For example, the line between personal and corporate data use quite often overlaps as individuals demand to enjoy the benefits of an always connected (anytime, anywhere, and on any device) world. For many, the use of data and connectivity is considered an essential part of their lives. It is not uncommon for someone to notice their mobile phone missing before they would notice a missing wallet or set of keys as individuals are quite often checking their mobile device every few minutes. In fact, smart phones and devices are constantly providing new emails, texts, tweets, posts and notifications on an ongoing basis in addition to providing the traditional function of routing phone calls. The key factor is that data usage is increasing and the cost involved with data usage can be significant. Further, it is increasingly difficult to determine what the data is being used for. Historically, with the first devices came out, email usage was all that determined data use. Then web browsers allowed users to consume data via web browsing. Today, there are a variety of available applications which makes for a wide range of data usage, and it is useful to know how this data is accessed and to categorize the usage by the types of transactions.

For some corporate activities, the costs associated with particular activities are tracked so that the cost can be allocated appropriately. Consider how the tracking and management of voice calls has evolved to include a level of granularity that supports charge-backs, allocation and personal or business cost tracking. Today's voice call tracking systems employ CDR (Call detail records) to keep track of individual voice calls. Using today's available methods from a PBX (Private Branch Exchange), call managers, and call accounting systems; each phone call is captured along with information pertaining to the call. For example, the caller (perhaps a physical desk for a land line call, or perhaps a code which is entered before making calls), the destination number, the length of the call, and the tariffs associated with the call. This record provides information for cost allocation based on tariff tables available from the carrier or service provider, or other pricing tables.

The cost for each call can then be allocated to a specific person or business entity. The call initiator and his/her department may assume the cost, or perhaps the cost is allocated to a customer or project based on the destination of the call. By knowing the time or length of the call and the destination phone number, it may be possible to track and determine if calls are personal or business related. Further, the destination numbers of customer contacts or customers corporate offices can help determine to which customers the cost should be allocated and reclaimed from.

Calling and usage trends and patterns can also be developed from this information to determine load or capacity across any date/time periods. Additionally, this voice call information can be combined with other business performance statistics to assist in determining positive and negative performance, causal traits and best practices that can then be applied to change the behaviour of individuals and/or business entities across the enterprise. If only a summary bill was provided at the end of the month, it would be impossible or at least very difficult and imprecise to attempt to allocate costs on a per voice call basis without the transaction level reporting.

In many office environments, even the process of tracking copier costs has evolved to include counters for departmental chargeback and cost allocation. Consider a mail room in a company where shipments are tracked; costs are allocated to the departments initiating the requests and perhaps reclaimed from the recipients of the letters and packages. Each package could be considered a transaction with a size (perhaps weight, and physical size) which determines the cost associated with the package and the postage necessary to send. The costs for all of these transactions (sending the packages) can be allocated appropriately.

Now imagine if that mail room could only tell when it was out of stamps, or worse yet, could only tell that there was a larger than expected bill that came in for last month from the post office. Perhaps the mail room clerk was mailing all of his personal Christmas cards and those of his friends using the company's postage meter. This is the current state that many corporations find themselves in with regard to their data usage, for example mobile communications data usage and associated costs. There is little or no visibility for what kinds of usage transactions are being made.

Just like the packages and letters in the above-described scenario, individual emails, posts, and other events that use data can be construed as individual transactions with an associated cost when looking at data usage. Some of these transactions are personal, other transactions are business related, and perhaps even in each category it is interesting to allocate some cost to clients, departments, or even campaigns/projects. However, to achieve a similar level of allocation as discussed in the mail room example, data usage information must be obtained on a transactional level.

Surprisingly when we consider overall costs, it's likely that the data usage costs for a company are significantly more expensive than copier and mail room costs in many office environments. For example, data usage may cost as much as ten to twenty times the cost of copiers and mail rooms. But, this data usage cannot be tracked with sufficient detail and reporting. More controls and the ability to manage, track and/or allocate the costs for data transactions are very much needed.

Further, when overages occur in the mail room or the copier or with CDRs, audits can be performed and the root cause of the overage can be traced to a clear set of transactions. Where appropriate, bills can be contested or action can be taken to avoid overage charges in the future. Unfortunately in most of today's overages related to data usage, there is a lack of tools and audit capabilities. Therefore, the enterprise has little or no recourse in challenging or even adjusting practices or usage in order to avoid data overages, because specific instances of data usage cannot be analyzed on a granular level. Accordingly, it is difficult if not impossible to determine the root cause of overages on a transactional level.

Data use and cost models can be analyzed and developed just like the example discussed above. An office environment can determine the overall cost of the infrastructure and bandwidth provided. In some cases data use may be limited to a total usage cost (e.g., 10 GB/month costs 'X' amount with overage charges of 'Y' amount). In other cases it may be cost per use, where the total usage is itemized at the end of the month and cost derived from a formula based on usage. In other cases it may simply be a fixed cost. Other cost models exist and these are provided to just illustrate how some Internet Service Providers (ISP) formulate their contracts.

The problem that most companies face is that, unlike the mail room example where each transaction can be monitored and cost can be allocated accordingly, data transactions cannot currently be effectively monitored. Most of the existing reporting systems for data use from service providers today offer a means of obtaining statistics or metrics to capture aggregated usage and overall cost. These metrics are typically limited to simple aggregate amounts of data used over time, employing units of measure associated with the user's bandwidth allocation and plan costs. The concept of data usage totals or costs per Megabyte are not particularly helpful as this does not provide sufficient detail about the data usage. As such, there is no effective means of gathering detailed usage events with data transactions for the allocation of costs or for the running of reports.

Additionally, with the growing trend of Over The Top (OTT) type applications that offer alternatives to a carrier's traditional SMS and Voice services, the growing number of OTT transactions also removes the ability for the carrier's systems to track and report on activity with traditional Call Detail Records (CDR), or SMS usage reports. Some examples of OTT type applications may include Facebook, Skype and other messaging or communication applications. While OTT may benefit end users by avoiding the costs of using services such as SMS or traditional Voice services and replacing them with "data based" alternatives, it also reduces visibility to the user's activities.

What is desired then is a system and method for monitoring, capturing, and identifying detailed data usage events (or data transactions).

What is also desired is a system and method for classifying data usage after the detailed usage events have been identified.

What is further desired is a system and method for allocating costs for data usage based on an identification of the detailed usage events.

What is further desired is a system and method for reporting and trending on data usage based on an identification of the detailed usage events. What is further desired is a system and method for determining and optimizing the effectiveness and efficiency of detailed usage events.

What is further desired is a system and method for determining, tracking, and optimizing the effectiveness and efficiency of the behaviour of the originating entity or device generating the usage transaction(s).

What is further desired is a system and method for controlling data usage by allowing usage when the cost can be allocated and thus charged to a particular individual, enterprise or service provider.

SUMMARY OF THE INVENTION

These and other objects are achieved by provision of a system and method that allows for information relating to data transactions to be gathered and analyzed, such that particular data transactions can be classified and associated costs can be applied for particular data transactions.

As stated earlier, data usage has proliferated on many different types of devices, including mobile devices, desktop devices, M2M communications and so on. However, all this data usage leaves data trails that can be "mined" for information and used to classify the particular usage into more granular designations. The classifications can be used to correlate data flows and resource usage into activity-based categories. Through this analysis and the application of pattern recognition, data-mining and resource consumption analysis; a level of detail regarding data usage can be obtained that is not available from the devices themselves or from the systems providing the services.

While methods to sift through raw payload data are known and are possible, encrypted content and privacy concerns create substantial problems in this regard. Accordingly, the use of simple data "typing" (classification) into broad categories rather than actual content inspection is preferable. The goal would be to match the gathered information relating to the particular data transaction with application or activity specific units of measure. In this manner acceptable usage policies can be enforced and/or costs can be overlaid on the particular data transaction.

From an administration viewpoint, the resultant information that is generated would be valuable input towards assessing productivity, determining security vulnerabilities, and controlling or allocating costs associated with data usage. From the perspective of someone that is tasked managing a communications budget or preventing data leakage from a security-conscious enterprise, this information can prove to be invaluable.

For OTT transactions where users take advantage of data connections rather than traditional SMS and Voice services, an analysis of the data usage can provide something similar to a CDR (call detail record). For example, by capturing and analyzing data streams and extracting transactions and events, call establishments, call length, and call termination can be shown, providing a similar CDR-like reporting capability. IP addresses or Skype user names instead of traditional phone numbers could be reported. Similarly instant messaging protocol transactions can be captured and counted like SMS events.

To accomplish the granular data mining required to analyze individual data transactions as described above, it is contemplated that software can be used to collect and analyze how much "data per application" or "data per destination" or even "data per application transaction type (i.e. each email size/avg size/destination etc)" is used, as opposed to the simple total "data used" format. This would include, for example, capturing application specific units of measure, tweets, posts, likes, and so on. This would further include correlating data to personal or business use. For example data used when a VPN (Virtual Private Network) is active, when in a business environment (on a domain) or in a home, or when in an unsecure public environment (public Wi-Fi).

This granular data analysis of data transactions will allow a system to allocate data usage and cost to personal or business purposes. In the example of business related data usage, identification of individual data transactions could be used to charge back the associated costs. For example, software can determine the destination and measure the size of a data transaction (e.g., sending an email with attachments) to determine that the email was business related and sent to a client. From that information, costs can be allocated to the particular data transaction based on the cost system set up by the company (e.g., fixed cost allocating a percentage of total use, or per usage cost that allocates the cost for the amount of data utilized, etc.). This is just one example of how costs can be associated with particular data usage.

The granular analysis of data transactions will also allow the system to determine Per Application (App) metrics. For example, the system would be able to determine data metrics relating to data usage on Facebook® or Twitter® and so on. Alternatively, or in addition, reporting can be provided on broader categories, such as determining data usage for Social Networking sites generally.

Detailed data usage transactions can also be captured at the origination point instead of aggregated from $3^{rd}$ party service provider. In some cases, specific usage may go untracked if it is conducted on an alternative network or data channel (i.e. wifi in a coffee shop or other public/private venue) either on a regular or ad hoc basis. This common activity may further hide data usage transactions since the usage is part of another communication network or service on which the usage is free and not applicable or tracked back to the user. Absent granular analysis of data transactions, this type of usage would be unavailable for trending, costing, efficiency and effectiveness tracking, or usage plan optimization. In one example, if an individual habitually uses wi-fi instead of cellular data, it may be more appropriate for that individual's plan to have a lower amount of data. In other examples, if the individual's use of wi-fi is un-predictable or sporadic, the cellular data plan would be capable of auditing and adjustment accordingly.

The system may be designed to determine and optimize the effectiveness and efficiency of certain usage events. For example, the system may optimize data usage in relation to service agreements and rate plans in order to avoid overage charges. In some cases, the reporting can notify the user of the effectiveness of their data usage. The reporting may also suggest different patterns of usage in order to manage usage and costs. For example, if a device is connected to free or public wi-fi, the device may be permitted to send files of large sizes related to personal use such as a full size picture. In the case where the device will use a cellular data network to transfer large size files, the reporting may be used to suggest alternate behaviour related to data usage prior to sending. For example, if the device is prepared to send an e-mail over a cellular data network containing a large picture that is for personal use, the system could be configured to generate and transmit a report or alert to the device that suggests sending the picture in a smaller size. In other cases, the system could be configured to automatically send the file in a compressed or smaller size based on pre-determined or defined settings. In the case where the large file is being sent for business purposes, a notification could be sent to the device in order to suggest that the large file is sent when wi-fi is next available. The system could also be configured to allow the individual using the device to override the warning or notification, especially in the case of data usage over a cellular network for business purposes.

Being able to allocate data usage to certain services (i.e., whether local or in the cloud) provides another distinct advantage, namely, allowing for a company to make a determination relating to cost justification for the services, or again allocation of costs to personal or business.

It is also anticipated that as internet-based content becomes more widely available, data access and usage charges may be rolled in or partially covered by the content provider. As the world moves more and more towards communications usage dominated by data only usage, it will be desirable for service providers to charge not only for data as they do today, but also for the types of data used by employing systems and methods contemplated herein. Examples may be to allow free data usage to consumers shopping on an e-commerce website, but to pay for educational content, to allow free promotional content but to pay for emails. At a transactional level even the destinations of email addresses, the size of the email addresses can be used to affect whether or not they are paid, or the rates at which they are charged, just as they are in the physical mail room example. It is also contemplated that the purpose of the data usage may result in higher costs as higher bandwidths may be required. For example, video streaming may be more expensive than e-mail. In other cases, uploads may be more expensive than downloads. Therefore the data transactions can indicate various purposes, destinations, sources and others in order to provide sufficient granularity in order to properly allocate costs.

The above are simply provided as examples of areas that can be analyzed and the resultant benefits that can be obtained based on the identification of particular data transactions and are not intended to comprise an exhaustive list.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

In one aspect, a system is provided for monitoring data usage of a device and generating a report relating to the data usage of the device. The system may include a server connected to a network. A storage may be accessible by the server. Software executing on the server may receive a data stream relating to data usage by the device. The software may extract a data packet from the data stream. The software may analyze the data packet to extract a source address or a destination address or a Universal Resource Locator (URL) to generate formatted usage data. The software may match the formatted usage data to known data to generate a data transaction. The software may further allocate a cost for the data transaction and generate a cost report based on the cost for the data transaction.

In another aspect a method is provided for monitoring data usage of a device over a network and generating a report relating to the data usage of the device. The method may include one or more of the steps of: Connecting a server having a storage to a network; Receiving a data stream at the server, the data stream relating to data usage by the device; Extracting a data packet from the data stream with software executing on the server; Analyzing the data packet with software executing on the server to extract data packet information including a source address or a destination address or a Universal Resource Locator (URL), and generating formatted usage data based on the extracted data packet information; Matching the formatted usage data to known data; Generating a data transaction based on the matched formatted usage data; Allocating a cost for the data transaction; and generating a cost report based on the cost for the data transaction.

In another aspect a system is provided for allocating communication costs. The system may include a computer and a first storage containing a plurality of data transactions, each data transaction having a value indicative of a device's data usage of a communication resource. A second storage may contain at least one cost record indicative an entity's cost associated with the communication resource. Software executing on the computer determines an allocated cost by comparing the cost record to a data transaction to determine what part of the cost is attributed the device based on the value. Software executing on the computer may generate a cost report based on the allocated cost associated with the data transaction.

In another aspect a computer implemented method is provided for allocating communication costs. The computer may perform the steps of: Accessing a first storage to retrieve a data transaction associated with a device, the data transaction having a value indicative of the device's usage of a communication resource; Accessing a second storage to retrieve a cost record indicative an entity's cost associated with the communication resource; Comparing the value of the retrieved data transaction to the retrieved cost record; and Generating a cost report based on the comparing step, the cost report indicative of the cost allocated based on the value of the retrieved data transaction. It is understood that the first storage and second storage may be different parts/locations of a larger storage, or part of different storages.

In another aspect a system is provided for allocating communication costs. The system may includea computer and a first storage containing a data transaction having a value indicative of a device's data usage of a communication resource. A second storage may contain a cost record indicative a cost associated with the communication resource. Software executing on said computer may generate a cost report by comparing a cost record to a data transaction to determine a cost attributed the device based on the value.

In yet another aspect a system is provided for allocating data usage by a device accessing data via a network connection. The system may include a computer coupled to the network. A storage may be accessible by the computer, the storage containing first data having a value indicative of a device's data usage. Allocation rules may further be contained in the storage, the allocation rules indicative of data usage that can be allocated to an account. Software executing on the computer may compare the allocation rules to data usage associated with the first data to determine if the first data can be allocated to the account. Software executing on said computer may generate a report to allocate at least part of the value to the account based on the allocation rules.

In still another aspect, a system is provided for controlling access to data usage by a device accessing data via a network connection. The system may include a computer coupled to the network. A storage may be accessible by the computer, the storage having cost data indicative of a cost associated with accessing data, and account data indicative of a total amount of cost that can be charged to an account for accessing data. Software executing on the computer may receive a data request indicative of the device requesting access to data via the network, the request associated with the account and including at least one value from which a cost associated with the data request can be determined. Software executing on the computer may determine a cost associated with the data request. Software executing on the computer may compare the cost associated with the data request with account data associated with the account to determine if the cost associated with the data request can be allocated to the account. Software executing on the computer may allow the device to receive the data associated with the data request when the cost associated with the data request is allocated to the account.

In some aspects, the account may include at least first and second accounts, the first account associated with an internet commerce provider or a media provider, the second account associated with a client identifier. The system may further include a first partial allocated cost generated by the software executing on the computer to allocate part of the allocated cost to the first account based on a comparison of the type of the data usage and the allocation rules. A second partial allocated cost may be generated by the software executing on the computer to allocate another part of the allocated cost to the second account based on a comparison on the type of the data usage and the allocation rules.

Other objects of the invention and its particular features and advantages will become more apparent from consideration of the following drawings and accompanying detailed description.

DETAILED DESCRIPTION OF THE INVENTION

Figure 1:
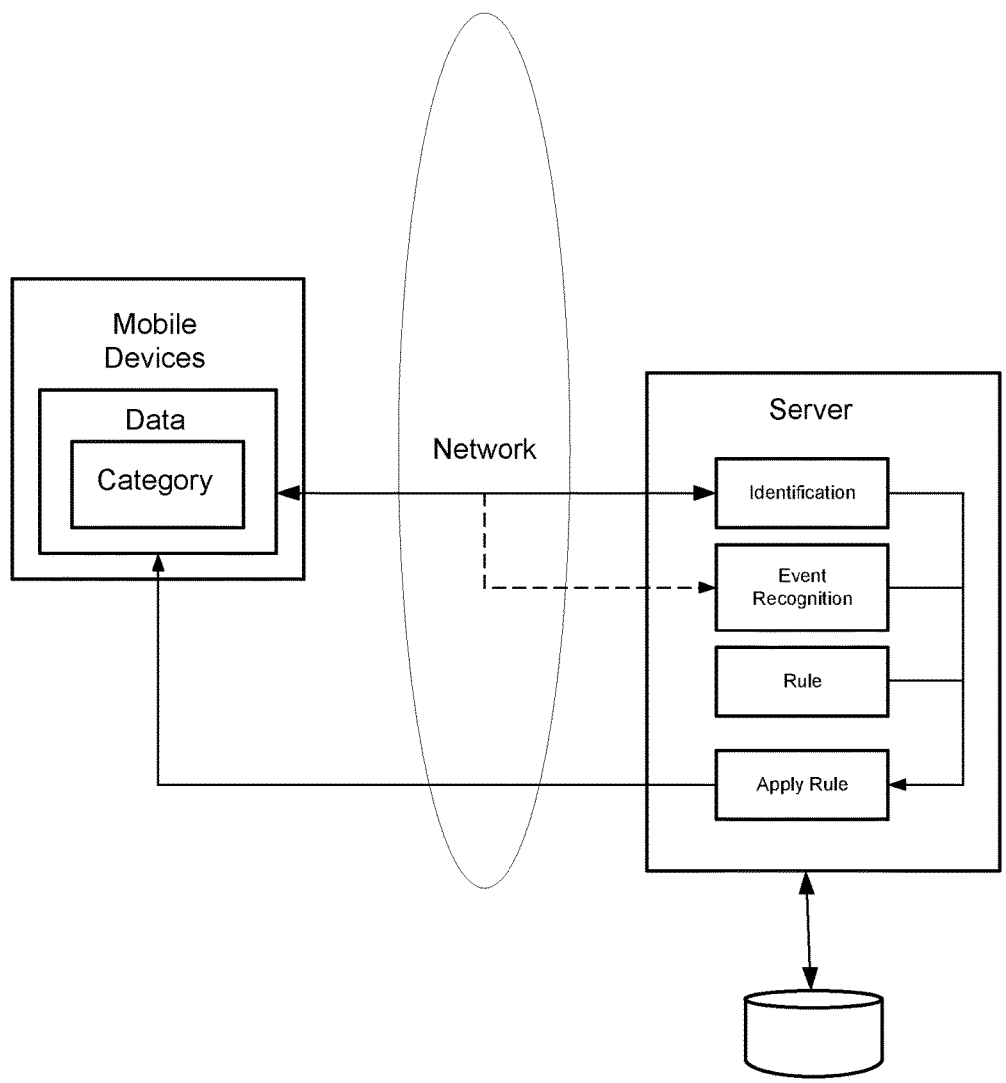
FIG. 1 is a block diagram of one embodiment of the invention.

Referring now to the drawings, wherein like reference numerals designate corresponding structure throughout the views.

FIG. 1 generally shows a system 100 for monitoring data usage of a device and generating a report relating to the data usage of the device. In this instance, a plurality of mobile devices (102, 102' . . . 102") are wirelessly connectable to a network 104. In addition, cloud computing resources such as servers and/or storage can be connected to the system, and the system can likewise monitor data usage for these cloud computing resources.

It should be understood that the mobile devices may take the form of any type of wireless communication device that transmits or uses data. For example, the mobile devices may comprise a smart phone, a tablet, a lap top computer, a notebook computer, a Bluetooth device, a tablet device, or a M2M (machine 2 machine) device whether in, for example, a smart automobile or even wearable technology. In the example of M2M communications, this may include computing resources that have data usage without direct human interaction. For example, if a local file storage system is regularly backed up to one or more off-site locations Also depicted in FIG. 1 is a plurality of hard-wired devices (106, 106' . . . 106") connected to network 104. It should be understood that the hard-wired devices may comprise, for example, a desk top computer, a server or other type of hard-wired computer equipment, a device that utilizes M2M communication in, for example, a smart home and so on.

The network 104 may comprise any number of data communications equipment including, for example but not limited to, proxy servers, routers, switches and so on to enable the plurality of mobile devices (102, 102' . . . 102") and the plurality of hard-wired devices (106, 106' . . . 106") to access, send or receive data.

Also shown in FIG. 1 is a server 108 connected to the network 104, the server 108 being coupled to a storage 110. Cloud computing resources 101 are also in communication with the server 108 over the network 104. These cloud computing resources may be cloud servers running internet hosted applications or SaaS applications. For example, Customer Relationship Management (CRM) and other hosted software applications. Cloud computing resources can also include cloud storage, for example data backups. The system can monitor usage associated with data exchange between various local computing resources and the cloud computing resources. Finally, a computer 112 is illustrated as being coupled to the network 104 and/or the server 108.

Figure 2:
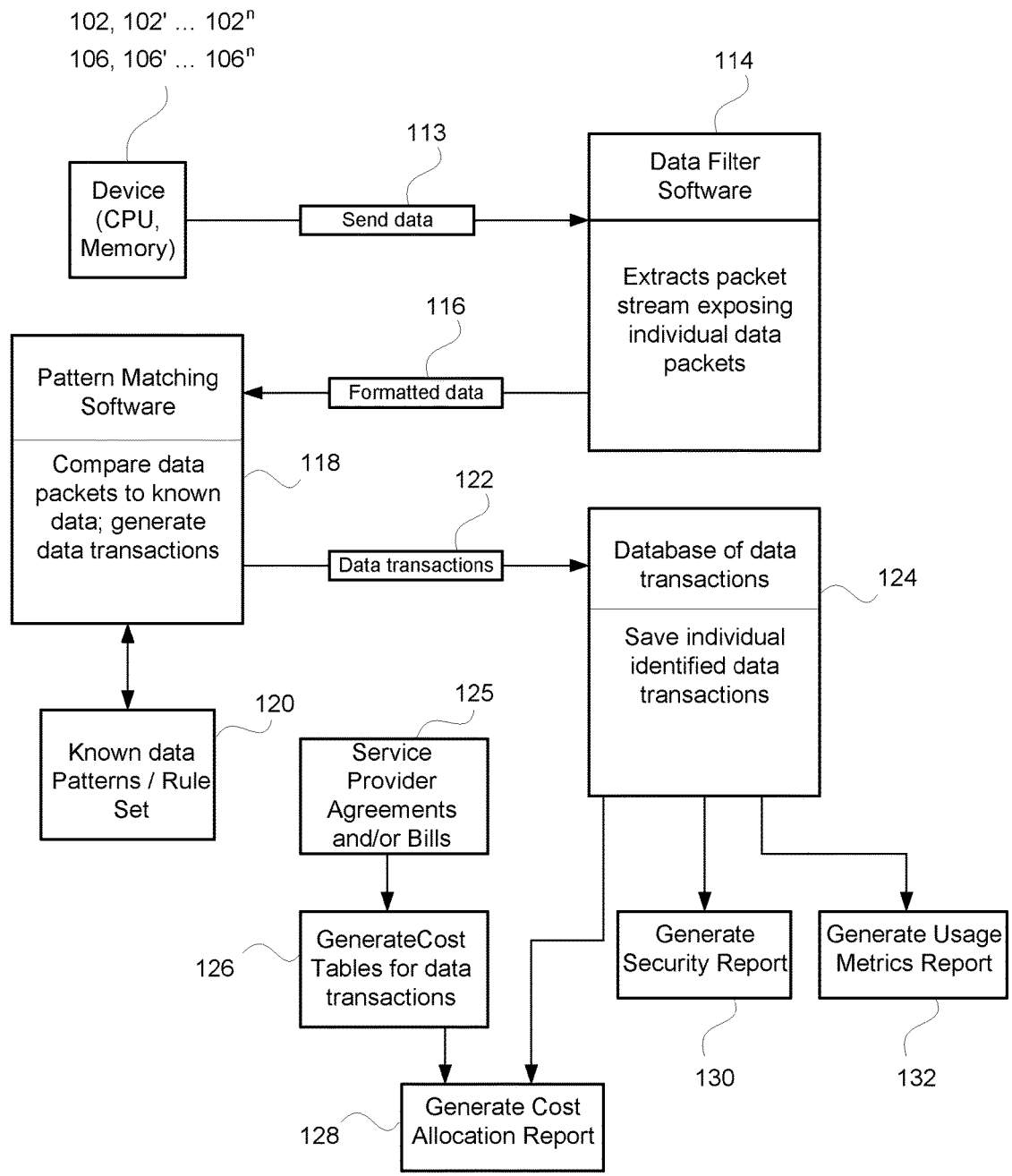
FIG. 2 is a functional flow diagram according to the block diagram of FIG. 1.

Turning now to FIG. 2, a functional flow diagram is illustrated showing a device (102, 102' . . . 102"; 106, 106' . . . 106") including a Central Processing Unit and a Memory, transmitting a data stream 113 to data filter software 114. It is contemplated that the data filter software could comprise software that runs on, for example, server 108. The data filter software extracts data packets from the data stream for identification of the individual data packets. In one embodiment, the data filter software is capable of capturing and extracting information from data packet types and headers. For example, the data filter software may look for Transmission Control Protocol/Internet Protocol (TCP/IP) trace data to another system, or may look for User Datagram Protocol (UDP) trace data.

Once individual data packets have been extracted from the data stream, the data packets are transmitted as formatted data 116 to pattern matching software 118 that may, for example, run on server 108.

The pattern matching software 118 receives the formatted data 116 in the form of individual data packets to compare the individual data packets to known data patterns 120 to generate specific data transactions 122. The known data patterns 120 may be saved on storage 110 and include a wide range of information including, for example but not limited to, Universal Resource Locator (URL) data associated with known domains (e.g., a specific URL associated with Facebook®), or IP addresses that can be correlated with onboard apps that may be active, or TCP/IP data, or UDP data, or known data patterns that a protocol analyzer or packet sniffer could utilize to associate the data packet with particular information, or domain controller data to detect when the device is connected to an office environment as opposed to public Wi-Fi SSID to detect when the device is connected to a public environment. These are just examples of the very diverse data that can make up the known data that the data packet may be matched against and is not intended to comprise an exhaustive list or be limiting.

Once a data packet is associated with known data to form a data transaction 122, the data transaction is saved in a database of data transactions 124 that may reside on, for instance, storage 110.

The database of data transactions 124 may then be used to generate a number of different types of reports. For example, the individual data transactions may be used to generate a cost allocation report. 128. In order to generate table for the data transactions 126. From the cost allocation report, the system could then generate a cost allocation report 128 for the individual data transactions with cost tables 126. These cost tables may include cost records and other information pertaining to the service or provider agreement and/or bills 125 that are between the entity and the telecommunication or communication resource provider.

There are many different types of cost methods that can be utilized and will typically be determined by the billing arrangement with the service provider. The following examples of billing arrangements are provided as examples of how costs could be distributed in a cost table for allocation. The following examples are presented to further illustrate and explain the present invention and should not be taken as limiting in any regard.

For fixed cost systems, the total cost could be detailed and distributed across all data transactions. In this arrangement, low data usage months would result in larger per data transactions costs than in large transaction months. However, the information provided is helpful as it provides insight as to the ongoing data requirements and provides, for example, justification to having the bandwidth and infrastructure of a specific size and amount.

For usage based models, actual costs can be allocated to data transactions based on the transaction size. For example, an email of size 'X' was transmitted from Company 'A' to Company 'B'. In the example, Company 'A' can charge Company 'B' the cost incurred to send the email, which will be directly related to amount of data used to send the email.

For contract and overage based models costs per transaction can be allocated using a combination of models where while under the contract maximum, transactions are allocated similarly to the fixed cost model. Any overage charges could be evenly distributed across all data transactions or, alternatively, could be applied to the largest transaction alone that perhaps generated the overage.

In order to have an accurate system of charge-backs and cost allocations, a framework of data transaction capture and processing needs to be put in place so that the raw data can be captured, analyzed, identified and associated with known data so that costs can be allocated on a per data transaction basis.

It will also be understood that not all licensing models or cost models are strictly based on usage. In these cases, the cost calculation may include other determining factors in addition to the size and amount of data used. Some examples include variable costs depending on the time of day/night/ weekday/weekend, and a cost model based on concurrent usage or perhaps bursts of data. In addition to cost, the Service Level Agreement (SLA) provided by the ISP can also be tested through the data transaction capture and measurement process, and perhaps times where SLAs are not met can lead to discounts in the overall cost of data use through penalty clauses and service credits.

The database of data transactions may also be used to generate a security report 130 or a usage metrics report 132. A security report 130 could include a wide variety of information including bringing to light potential security breaches or areas of weakness. Logging the usage of devices can provide valuable insight for a security conscious organization in determining how and where the organization may be vulnerable. A usage metrics report 132 may include much of the same information as is provided in a security report 130, but with a focus on the data usage of the devices (for the organization) to better see how the data communications system can be adapted to actual data usage. For example, the particular billing arrangement may not be a good fit with the actual data usage of the organization; or the data plan(s) may not be a good fit with actual data usage.

These systems can also be used to automatically detect the usage of applications and systems (local or cloud based) that access or transfer data over the internet and over the data pipe in order to allow for enhanced reporting of data used by these local or cloud based applications or systems. Further, the system can allow for chargebacks and allocation of costs associated with the data usage for the local or cloud based applications.

Figure 3:
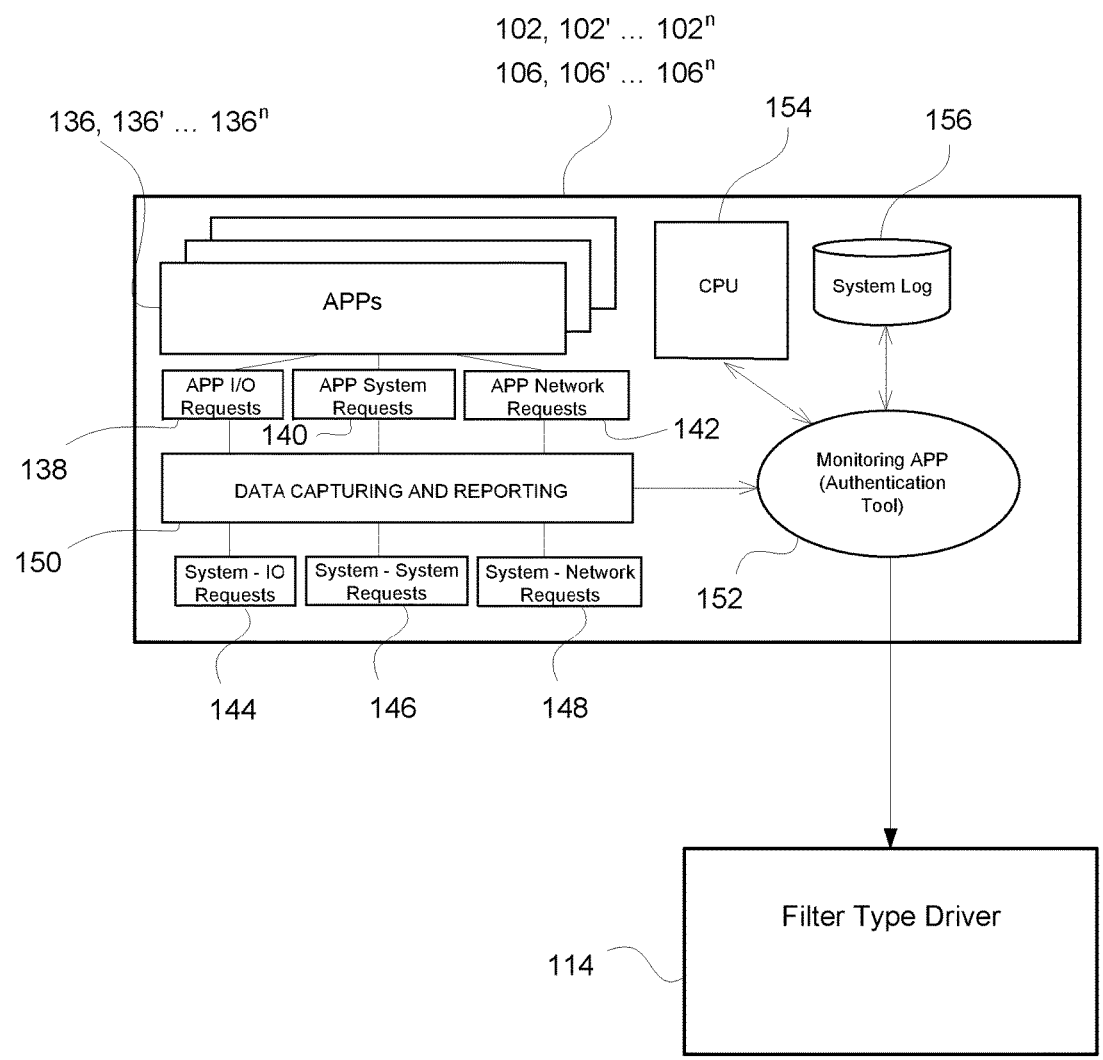
FIG. 3 is a functional flow diagram according to FIG. 2.

Referring now to FIG. 3, a device (102, 102' . . . 102″; 106, 106' . . . 106″) as per FIG. 2 is illustrated in greater detail connected to the data filter software 114. As can be seen, the device typically includes a number of APPs (136, 136' . . . 136″), which may include Native APPs (e.g. Facetime, iMessage, etc.) and Wrapper APPs (e.g. Facebook, Twitter, Youtube, etc.). For each APP there are a number of requests the APP can make including, for example, APP—IO Requests 138, APP—System Requests 140 and APP—Network Requests 142. Also illustrated in FIG. 3 are System—IO Requests 144, System—System Requests 146 and System—Network Requests 148.

All of the above types of Requests can be captured and the data reported or provided to a Monitoring APP 152 that may be resident on the device. The various types of requests can provide valuable information relating to the APPs that are currently active on the device. In this manner, the system can monitor, for example, usage characteristics of a Central Processing Unit (CPU) 154 or a Memory 156 and then correlate the monitored CPU or memory usage with the active APPs running on the device. Alternatively, the system could monitor any active APPs on the device and correlate Transmission Control Protocol/Internet Protocol (TCP/IP) data or User Datagram Protocol (UDP) data with particular APPs. In addition, proxy servers or routers/switches could be used to capture data traffic from IP addresses and then the system could correlate that data with any active APPs on the device. Still further, the monitoring APP can serve as an authentication tool to capture a session establishment or a login to a system so as to associate particular data usage with the established session or the system that was logged into. All these are provided as just examples of how the system can mine for data by looking at a plurality of data sources provided to the data filter software 114.

In addition to CPU usage and memory usage, the system could look at the volume of data and correlate this with active APPs. Still further, the system could use URLs in data packets or could correlate IP addresses with known domains.

Additionally, the system could watch data traffic over port designations or utilize existing APIs to these APPs to extract data usage statistics. The use of packet sniffers and/or protocol analyzers could also be used to capture data traffic and, by comparing the captured data to known data patterns, to classify and categorize them.

Figure 4:
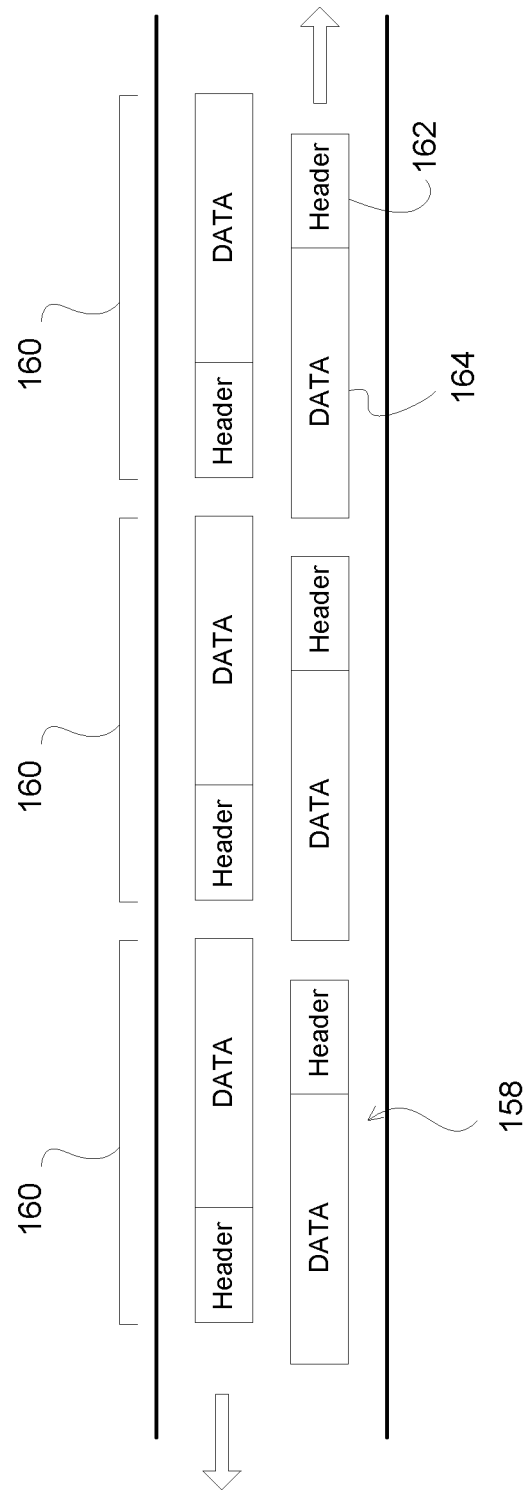
FIG. 4 is an illustration of transmission of packets of data according to FIG. 2.
Figure 5:
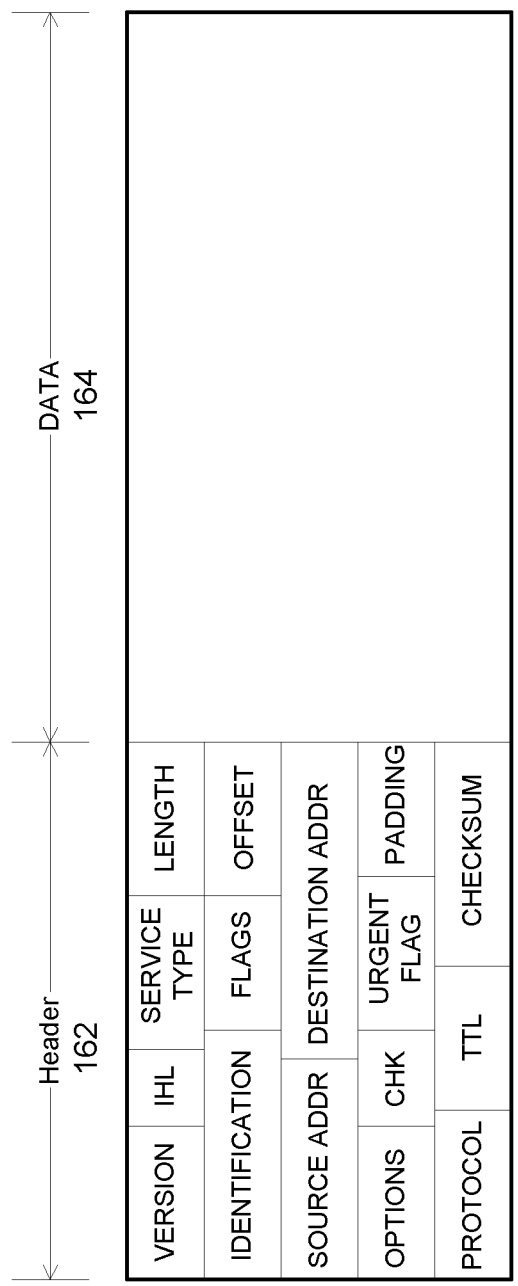
FIG. 5 is an illustration of a packet of data according to FIG. 4

Turning now to FIGS. 4 and 5 a data stream 158 is illustrated. The data stream 158 consists of data packets 160 of varying sizes and types that are flowing by in both directions.

The data stream 158 is provided to the data filter software 114, which may include the monitoring APP 152 that is loaded onto the device (102, 102' . . . 102″; 106, 106' . . . 106″) and may receive data captured from the APPs (136, 136' . . . 136″) running on the device (102, 102' . . . 102″; 106, 106' . . . 106″), as previously discussed.

Each packet 160 includes a header portion 162 that describes the packet 160 and a payload 164 that contains the information being transported. For example, the packet 160 may comprise an email message where the header contains the To/From addresses and subject line, whereas the payload would contain the data in the message body along with any attachments or images contained therein.

In the header portion 162, the packet filter selects the information required to properly classify the packet 160 based on a defined rule set. For example, for email messages, the rule set could be defined to capture the Source Address (sender) the Destination Addresses (To and CC lists), the Length (size) of the message as well as some other elements, such as, the date the message was sent.

The known data patterns 120 may comprise a file saved on storage 110. The file would include information that enables the pattern matching software 118 to determine how to detect packet types and what fields to capture from each of the event types. Table 1 provides an example of packet types and fields that could be captured:

TABLE 1

| Description | Protocol | Identifier | Fields to Capture |
|---|---|---|---|
| Email Message | SMTP | Packet ID | From, To, Size, Date/Time |
| Social Media Tweet | HTTP | HTTP (tag) | Destination, From, Date, Size |
| Social Media Post | HTTP | HTTP (tag) | Destination, From, Date, Size |
| Social Media Login | HTTP | HTTP (tag) | Platform, Date, Size |
| CRM Login | Proprietary | TCP Pack ID | Platform, Date, Size |
| CRM Lead Entry | Proprietary | TCP Pack ID | Date, Time, Deal Size |
| CRM PO generation | Proprietary | TCP Pack ID | Date, Time, PO Number, Customer, Amount |
| ... | ... | ... | ... |

The pattern matching software 118 could then use the rules set and known data pattern 120 to figure out what data packets should be extracted and routed. Depending on the technology used to extract data packets from the packet stream, the data packets are either put back in the stream, or if a copy was made to feed the pattern matching software 118 then unwanted packets could be discarded. Still other packets may be passed through without any processing or extraction.

The extracted and recognized packets are reformulated according to the rule set and known data patterns in the rule set and then delivered as relevant data (data transactions) to storage 110, including normalized data where reports can be run and further downstream analysis can be performed.

Figure 6:
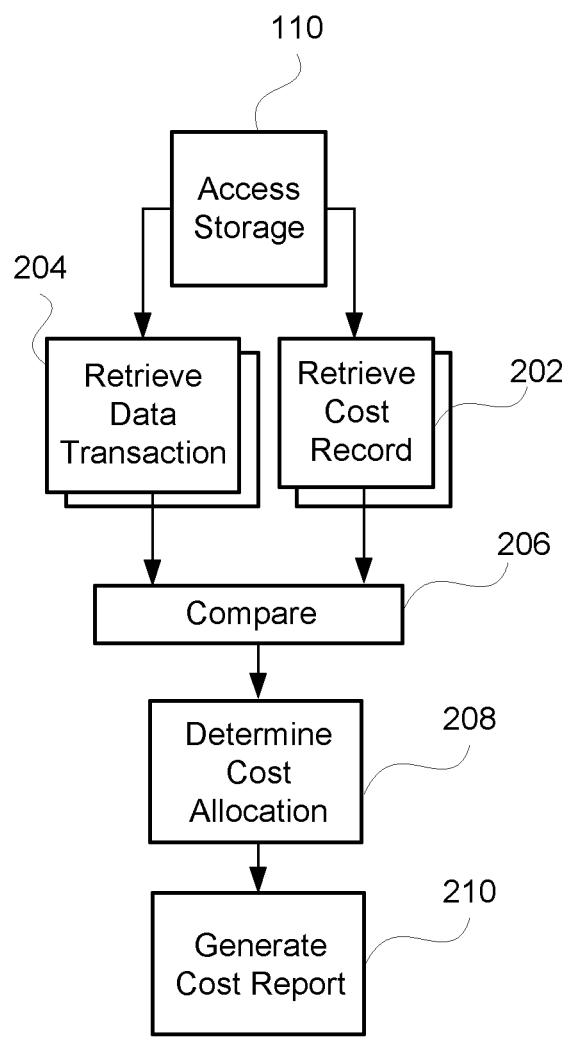
FIG. 6 is a block diagram showing an aspect of how cost reports shown in FIG. 2 are generated.

In FIG. 6, the storage 110 is accessed to retrieve data transactions 204 and to retrieve cost records 202. The data transactions can indicate the purpose of the data usage, for example, personal or business. It is also contemplated that business usage may be attributed to internal or external purposes. For example, sending an e-mail to a client could be usage attributed directly to that client. Therefore, a client that receives large files and thus uses a large amount of data can be charged based on this usage. Cost records may be associated with the cost of an entity in relation to a particular communication medium. In some cases, the cost for one communication medium may be in a bill for multiple other services. For example, some telecommunication carriers provide TV, phone and internet service. Therefore, the cost record can be associated with one or multiple services. In some cases, the cost record will be associated with only one service. The cost record includes data about the total cost of the service(s) and the total usage of the service(s). The retrieved data 204, 202 is compared 206 to determine cost allocation 208. This comparison may, for example, use the cost record associated with internet service to determine what percentage of internet usage is attributed to the particular data transaction. Using the percentage allocated to a particular data transaction, part of the cost for internet service can be allocated to the usage associated with the data transaction. Based on the comparison and the cost allocation, the system generates a cost report 210.

Figure 7:
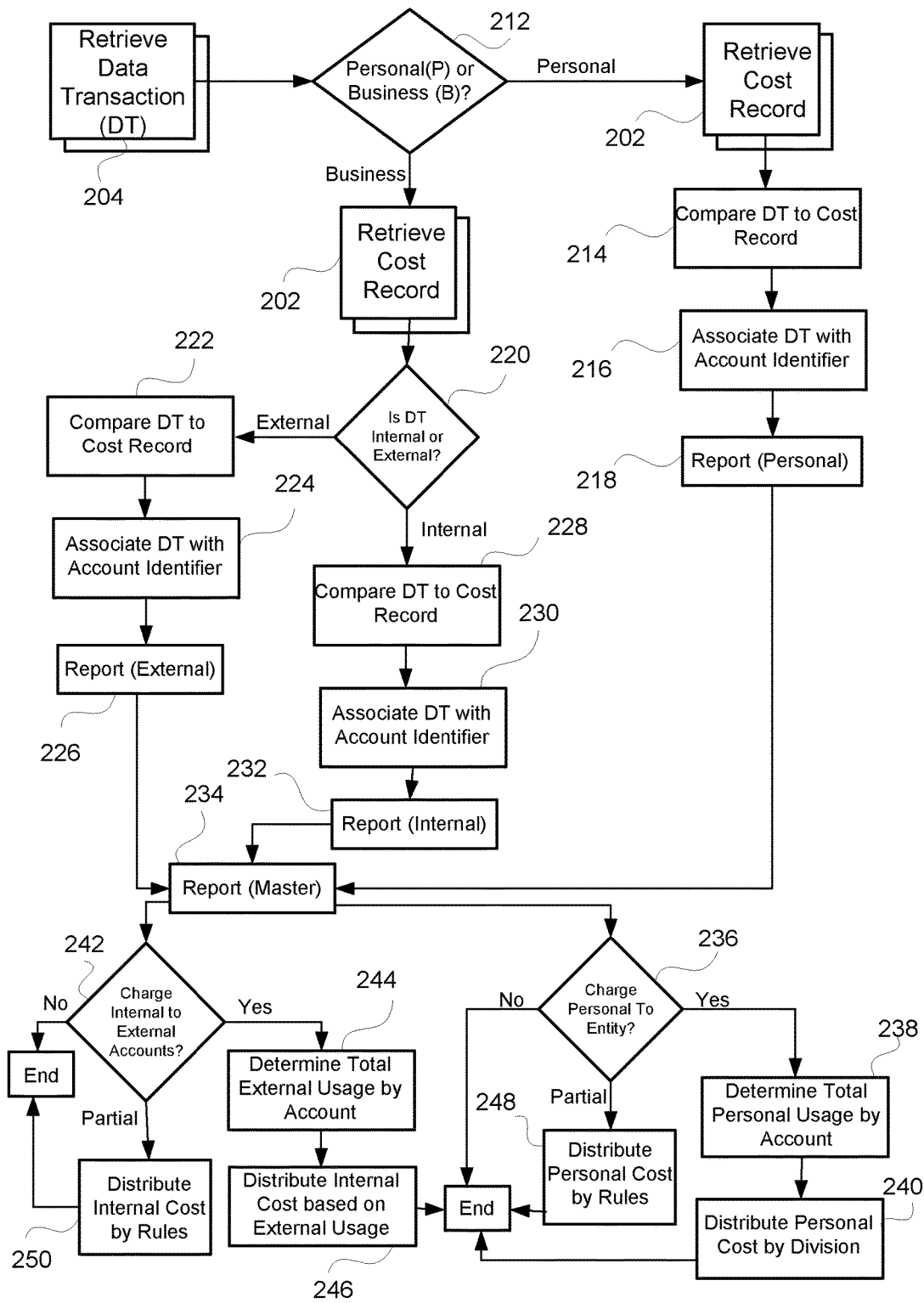
FIG. 7 is a functional flow diagram showing additional aspects of how cost allocation reports of FIG. 2 are generated.

In FIG. 7, the data transactions 204 are retrieved. The system determines 212 if the purpose of the data transaction is business or personal. If personal, the cost record 202 associated with the communication resource of the data transaction 204 is retrieved. The data transaction and cost record are compared 214 to determine what percentage of the usage of a particular communication resource or service is attributable to the data transaction. An account identifier is associated with the data transaction 216. In the example where the data transaction is personal usage, the account identifier can be associated with the individual using the particular device that used the data of the data transaction. A cost report 218 is generated for personal usage. Although data transactions 204 are shown as being retrieved, it is understood that data records can also be retrieved. These data records may be indicative of usage of types of communications resources other than data. For example, telephone, mobile phone and other communication resources.

If the usage purpose is business, the cost report associated with the communication resource used is retrieved 202. The system determines if the data transaction is associated with internal or external usage 220. In the case of external usage, the data transaction and cost record are compared 222. An account identifier is associated with the data transaction 224 and a report 226 is generated. External usage may be, for example if an e-mail is sent to a client, the data transaction would be indicative of this purpose, thus the internet usage associated with sending the e-mail is attributable directly to the client. A similar process is followed for internal usage. Where data transactions and cost records are compared 228 and associated with an account identifier 230. A report 232 is generated. The personal 218, external 226 and internal 232 reports may be combined to create a master report 234. External costs will typically be charged to the external sources in most cases; however, it is contemplated that the external costs may be used for internal accounting associated with particular projects. In some cases, internal costs may be charged in various ways. In some cases, internal costs will not be allocated to external accounts. In other cases part of the internal usage may be distributed based on rules 250. These rules may be a number of things. For example, there may be maximum values to allocate, there may be minimum values required for allocation, in some cases percentages may be set in order to allocate part of the costs. In some cases all internal costs are charged externally. In this case, the amount of external usage is determined on an account by account basis 244. The external accounts having a higher amount of usage are then allocated a higher amount of the internal cost, thus distributing internal cost based on external usage 246. In some cases, none, all or part of personally allocated costs may be paid by the entity. Similar to the charging of internal usage, personal usage may be distributed based on rules 248 such as, a percentage of the total, a threshold, a maximum or combinations. It is contemplated that other rules and customized rules may be set. In some cases, personal usage may be paid by the entity. In this case, the total personal usage is determined on an account by account basis 238. These personal costs are distributed based on what division or group the individual or the device is associated with 240.

It is understood that where partial usage is distributed to external or entity accounts, the remainder may be distributed as shown and described as if the remainder followed the corresponding "yes" arrows of FIG. 7.

Figure 8:
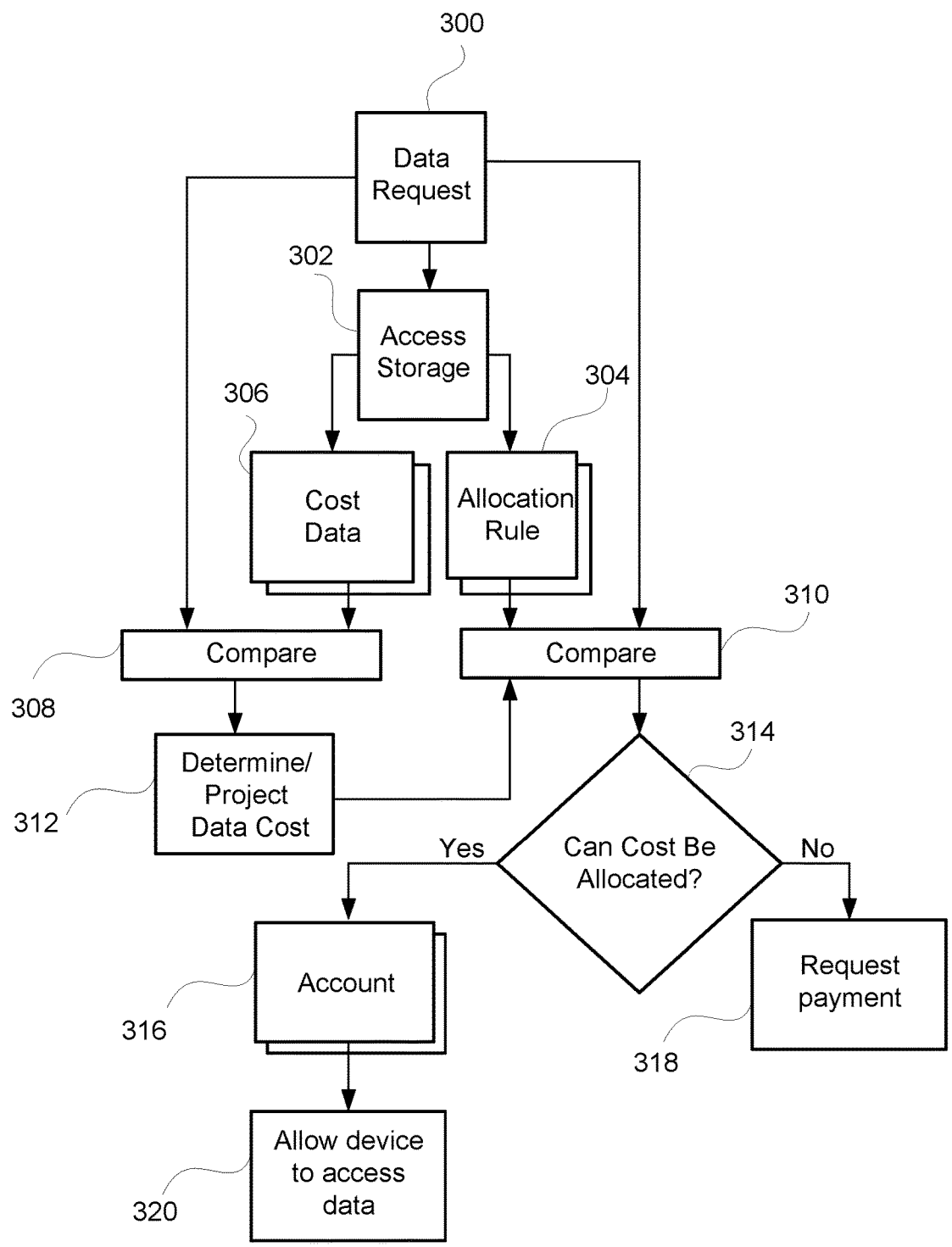
FIG. 8 is a functional flow diagram showing additional aspects of how costs tables of FIG. 2 and allocation rules can be used restrict data use.

In FIG. 8, a data request 300 is made, for example, by a device. This data request may be a request to access data. Although a request is shown, it is understood that data (including internet-based content) may be pushed to the device. The storage is accessed 302 to retrieve a cost data 306, account data 305 and allocation rules 304. The cost data allows the system to compare the data usage, for example by size, source, destination, type or other characteristic associated with the data usage in order to determine the cost associated with the data usage. The allocation rules designate how different data costs can be allocated based on various agreements and data types. For example the data service provider may have an agreement with an internet-based content provider that all or part of data usage for the types of accessing content of the internet-based content provider is charged to an account that is associated with the internet-based content provider. It is further contemplated that the allocation rules can designate what data costs can be charged to the internet-based content provider account, depending on the type of the data use.

In order to determine which data transactions are associated together with a result such as a purchase, the system compares identifiers associated with the data transactions to determine which data transactions are commonly associated with the result. The identifier can be information such as source address, destination address or URL. Thus, a user can use their device to access an online store such as an internet-based content provider, for example, iTunes by Apple, Inc. This user can browse media content and then select the appropriate media content to browse or download.

The browsing can be associated with a number of data transactions that are associated with the exchange of data. For example, the user could view a number of movie previews before ultimately deciding to purchase or rent a particular movie. There would be data usage associated with viewing previews and browsing, and there would be data usage associated with the download/stream of the media content. If the user purchases or has an account that allows certain content streaming under a subscription agreement, the data associated with the purchase may be associated with the account of the internet-based content.

Each different type of data usage ie browsing, previewing, purchasing, downloading may be associated with its own data transaction. The downloading and/or purchasing data transaction types indicate a result, which allows the associated data transaction(s) to be considered result transaction(s). Allocation rules can further allow all or part of browsing/previewing data transactions to be associated with the purchase. In order to determine what transactions may be eligible for allocation, the system compares the identifiers such as source, destination and URL to the result transaction(s) (ie purchase/download of content) with other data transactions to determine which data transaction include a common identifier with the result transaction(s). Allocation rules are then compared across multiple data transactions having a common identifier and some or all of the data and/or cost may be allocated to the account associated with the media content provider. It is contemplated that larger purchase values would typically allow for larger amounts of data to be allocated to the media content provider (iTunes), although one of skill in the art would understand that the specific amount of data and/or cost that can be allocated would depend on the data service provider agreement, and the associated allocation rules. It is further understood that allocation rules can be modified within the system, for example through remote or local login to the computer. Modification to the allocation rules may reflect changes in the service agreement between a data service provider and one or more users.

The allocation rules may provide for different cost/data allocation results depending on the overall purchase value associated with a particular identifier. For example, if a particular device or user login is associated with a certain dollar value of monthly or annual purchases through a particular content provider (media content, online retail, etc.) the content provider may reward higher dollar values with higher amounts of data that are allocated to the content provider.

It is also contemplated that data types such as cellular data vs. land line data could be considered different types of data usage associated with different costs and limits. It is further contemplated that combinations of types can result in higher costs. For example, streaming video over cellular data could be more expensive than e-mail usage over cellular data, which could likewise be more expensive than streaming video over WiFi. These are exemplary only and are not intended to be limiting.

Some internet-based content providers may require higher bandwidth or transfer for delivery of the content. For example, data usage associated with video streaming typically requires higher bandwidth than e-mail data usage. Although the value of the data usage, for example in Megabytes, will depend on the data downloaded or uploaded, the system could provide for different performance levels depending on the service agreement and thus allocation rules. For example, a particular individual may wish to purchase higher bandwidths for online gaming and save money by using lower bandwidths for tasks such as browsing or online shopping. The allocation rules can be used to modify the delivered performance depending on the type of data used and if the costs associated with higher bandwidth (performance) can be allocated to an account such as a user account or the content provider account (ie. Netflix in a video streaming example).

Higher bandwidth data usage could be prioritized based on different data costs and per data usage rates and allocation rules. Therefore, the type of the data usage may be determined by the system such that data transactions can indicate the type of the data use in order to allow for modification of performance levels such as bandwidth based on allocation rules and the underlying data service agreement. Some exemplary data types could include data use for accessing internet-based content such as, online retail shopping or browsing, payment processing, product research (including product reviews), media streaming such as music, video and other content streaming, VOIP (voice over internet protocol) data usage, video conferencing, social media, click through advertising, and instant messaging to name a few data use types. Because the data transactions or data requests can specifically be designated with a type, multiple data transactions can be associated with an event that can be allocated to a particular account.

The allocation rules allow the system to determine which data transactions or data requests can be charged to which account. It is contemplated that these allocation rules can be rather simple or more complex. An example of a simple allocation rule may be associated with an internet-based content provider such as a video streaming service. For example, Netflix and Amazon Prime. When a user uses a device such as an internet connected television, typically, the streaming service application is opened, allowing the user to browse for a video they would like to watch. The browsing is associated with data usage, and likewise the streaming is associated with data usage. The data request associated with browsing and streaming video can be allowed based on the allocation rules. Thus, a simple example of an allocation rule would be to allow all data through a particular application and to charge a particular account for such data usage. For example, if the cost of streaming/browsing can be charged to a particular account, the system would allow the device to use data. Based on this usage, data transaction(s) can be generated to account for the different types and types of data use and likewise a cost of the data use can be determined based on the type and amount of data used.

It is contemplated that the allocation rule may provide that the streaming service application that is associated with a paid user account would be allowed to use data through the data service provider and that the allocation rules could associate all or part of the cost of the data use with a particular account. The account the cost is allocated to may be associated with the streaming service provider, the user, the data service provider or combinations thereof. In an example where data usage or cost cannot be allocated to an external account such as the streaming service provider account, the data usage or cost could be allocated to a user account that is associated with the individual whose device(s) are using the account. The account can be a mechanism the system can use to allocate cost and/or data usage, and the account may be associated with, for examples, individuals, groups, companies, enterprises, data service providers, content providers and the like. It is also understood that where the system limits access to data usage, the account could be associated with the individual who is actually accessing or using the data, for example, an individual who accesses data in order to stream video content. It is also understood that portions of the data usage/costs can be allocated to different accounts, depending on allocation rules, cost tables etc., thus one instance of data usage may have different portions allocated to different accounts. The "account" in some aspects can include payment information such as, credit card information, bank account information, online payment information, or system information.

In one example, the user subscription could include unlimited data usage through the streaming service websites, applications and the like. Thus, the cost associated with data usage for the streaming service may be charged directly to an account associated with the streaming service provider. This would allow data service providers (for example AT&T) to provide pay for use or a combination of subscription/pay for use model that would provide a free or discounted data connection to a user and then the internet service provider would be able to charge data use costs directly to the internet-based content provider.

In some cases, the device using the data will be associated with a login with the internet-based content provider. This login may be paid for in order to allow the device to access and thereby stream video content. In some cases, the internet-based content providers may wish to include the cost of data usage within the paid login rates, but only for the types of streaming video from the particular content provider.

As another example, e-commerce websites such as Amazon.com may wish to allow free or discounted data usage for customers or potential customers to browse products offered on the e-commerce website. Therefore, the system would allow a data service provider to allocate the costs of data usage on e-commerce websites to the company operating the e-commerce website. In one example, all data usage in browsing may be allocated to the e-commerce company when a purchase is made. In other cases, an amount up to a percentage of the value of the purchase may be allocated to the e-commerce company. An example of a more complex allocation rule would allow data transactions to associate a type of browsing product reviews with a purchase of one of the products or brands discussed in the reviews. For example, if an individual browses lawn-mower reviews for a number of products and ultimately settles on purchasing a lawn-mower online from HomeDepot.com, it is contemplated that the data transactions can indicate the type of the data usage and the system can associate all or part of the relevant data usage based on the allocation rules in order for the cost of the data usage associated with browsing and then purchase of a product to be charged to the company or individual selling the product. It is further contemplated that part of the cost may be allocated based on the value of the purchase.

When only part of a cost associated with data usage is allocated to the internet-based content provider, it is contemplated that the remainder of the usage may be allocated to the user (or user account). In some cases, the data service provider may have a maximum data usage for particular accounts and data usage that is not allocated to an account other than the user account would be charged to the user account.

Based on one or more of the cost data 306, account data 305 allocation rule 304 and data request 300, the system can determine/project the data cost 312 and the system determines if the cost of the data use can be allocated to an account 314. If yes, the costs associated with the data request 300 can be charged to one or more accounts 316, thus allowing the device to access 320 the data requested. If the cost cannot be allocated, the system would request payment 318 for the data cost. The payment request could also be an authorization to charge up to a pre-determined amount. Assuming payment is made, the system may then recognize that the cost can be allocated to an account and the device may be allowed to access the requested data. As previously discussed, the data usage resulting from the allowed data request may result in one or more data transactions being generated. Such data transactions can likewise allow audits to be performed to determine what data was requested and allowed and what the resulting charges were. In addition, the data transactions track the data request so that if cost cannot be determined in a monetary value upon the request, cost can be determined and allocated later, depending on the billing arrangement and billing cycle.

The cost data may be associated with different data service agreements, for example unlimited data usage plans, per usage plans, threshold usage with overage charges. Further, the cost can include different costs associated with different types of data usage as applied to the different service agreement arrangements.

Although the "cost" of the data request in monetary value may not be known immediately after data is accessed, as the service agreement for the data service provider may be a monthly charge with various thresholds of data use, for example, there may be unlimited or a pre-defined maximum data use and there could also be discounts and overages associated with the data service provider agreement. Thus, the cost could initially indicate a size of the data use (for example in Megabytes) and once a overall bill is generated, the cost in data size can be converted into a monetary cost thus allowing the cost of the data transaction to be allocated to appropriate accounts, departments, companies, individuals and the like.

Figure 9:
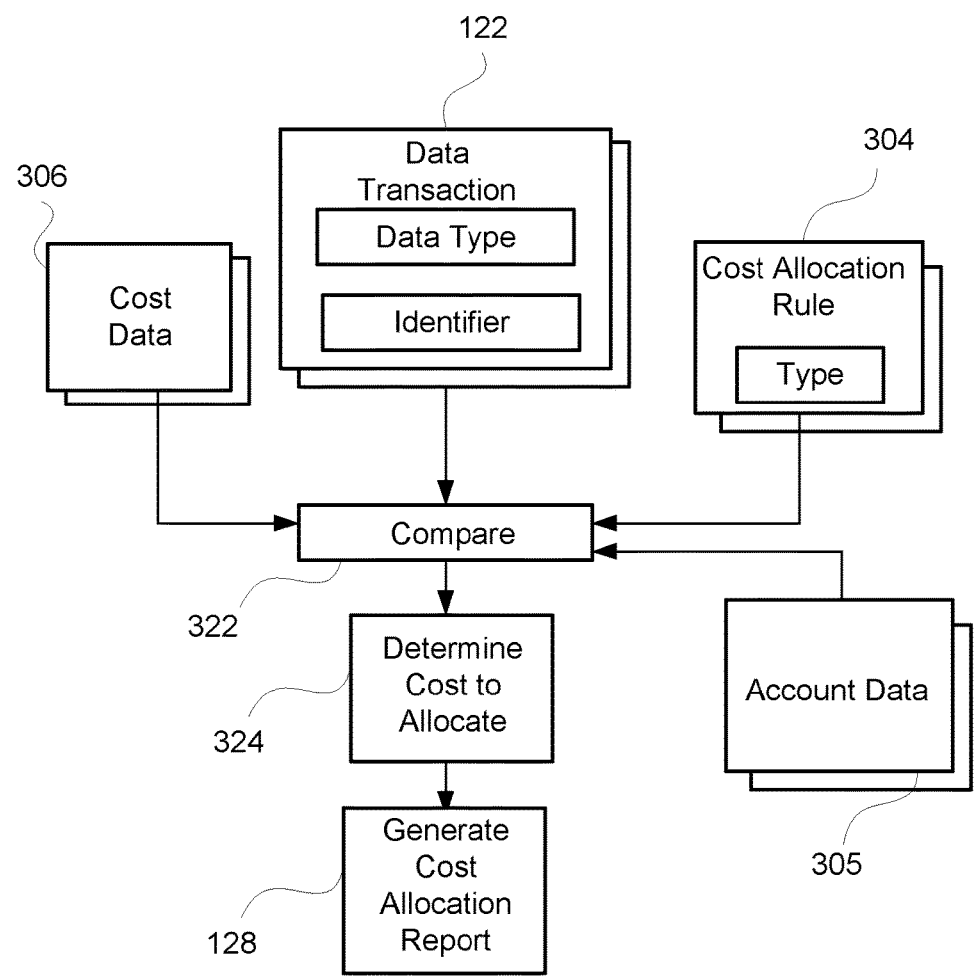
FIG. 9 is a functional flow diagram showing additional aspects of how the cost allocation reports of FIGS. 2 and 8 are generated based on data type.

In FIG. 9, another aspect is shown where data transaction(s) 122 include a data type. This data type can be, for example, online retail shopping or browsing, payment processing, product research (including product reviews), media streaming such as music, video and other content streaming, VOIP (voice over internet protocol) data usage, video conferencing, and instant messaging to name a few data types. Data type can also be designated based on how the data is accessed, for example over a cellular network or through land lines. The data type may also indicate if the media streaming was business related or personal so that costs may be allocated appropriately as previously discussed herein.

The data transaction may also associate the type with the source, destination and other information concerning the data usage as has been previously discussed. For example, the identifiers of the data transactions may be compared to determine which data transactions include common identifiers so that allocation rules 304 can be compared to multiple data transactions having common identifiers in order to determine which of the data transactions can be allocated to the account. Allocation rules 304 can also be associated with types. Thus the system can compare the data type, type and cost data(s) 306 to determine a cost to allocate 324. Thus if the data type matches a type associated with a allocation rule, the cost to allocate may be determined from the cost report and the particular requirements of the relevant allocation rule(s). It is understood that more than one allocation rule may apply to one data request or data transaction. Likewise, multiple data requests or data transactions may apply to a single allocation rule, for example due to common identifiers. Other combinations and permutations are contemplated. As shown in FIG. 9, a cost allocation report 128 is generated based on the cost to allocate 324 and the allocation rules 304. Although cost is shown, the system could also generate a report that allocates the value of data usage to an account without determining a monetary cost associated with the data usage.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for allocating communication costs comprising:
   a computer;
   a storage containing data relating to a first and a second data transaction each having a value indicative of a device's data usage of a communication resource associated with an application each data transaction generated based on, a plurality of data packets from a data stream between at least two computers, and extracted data packet information associated with each of the plurality of data packets;
   wherein based upon a source address, destination address or IP address or combinations thereof and the extracted data packet information, the first and second data transactions indicates a business data usage and are each associated with a different one of a division, a group, an individual within a company or entity, and an individual outside the company or entity;
   software executing on said computer comparing a cost record indicative of a cost associated with the communication resource to the first and second data transactions to determine a first portion and a second portion of the cost attributed to the device based on the value associated respectively with the first and second data transactions; and
   said software allocating the first and second portions of the cost to different accounts thereby causing usage via the application to be allocated to different accounts.

2. The system of claim 1 wherein said storage further containing a third data transaction which indicates a personal data usage, said software comparing the cost record to the third data transaction to determine a third portion of the cost attributed to the device based on the value associated with the third data transaction, said software further allocating the third portion of the cost to an account different than those accounts associated with the first and second data transactions.

3. The system of claim 1 wherein said storage contains a plurality of data transactions, said software further comparing each of the plurality of data transaction to the cost record to determine an allocated cost attributed to each data transaction.

4. The system of claim 3 wherein the plurality of data transactions are associated with an entity, the system further comprising:
   software executing on said computer associating the allocated cost with a group within the entity in order to charge the allocated cost to the group, wherein the group is associated with a plurality of devices.

5. The system of claim 4 further comprising:
   said software querying a cost table based on a type of communication resource to retrieve the cost record from said second database, wherein the cost table includes data pertaining to at least one service agreement relating to the communication resource.

6. The system of claim 1 wherein each data transaction is selected from the group consisting of: Internet, cellular data, SMS and combinations thereof.

7. The system of claim 1 wherein the cost record is indicative of the cost of the communication resource for a plurality of devices.

8. The system of claim 1 wherein the data transaction includes a source address or a destination address the system further comprising:
   said software querying the storage by at least one of the source address and/or destination address to determine if an address stored in the first storage matches at least one of the source address and/or destination address.

9. The system of claim 8 wherein at least one of the source address and/or destination address is indicative of an e-mail address.

10. The system of claim 1 wherein the first and second data transactions are further associated with a first user.

11. The system of claim 1 wherein at least one of the plurality of data transactions is indicative of data use for business purposes and the cost report is generated to associate a business account identifier with the data use for business purposes.

12. The system of claim 1 wherein at least one of the plurality of data transactions is indicative of login credentials for a cloud computing resource.

13. The system of claim 1 wherein the device is selected from the group consisting of: a smart phone, a tablet, a lap top computer, a desk top computer, a server, a device that utilizes machine-to-machine (M2M) communication and combinations thereof.

14. A computer implemented method for allocating communication costs, the computer performing the steps of:
   accessing data corresponding to a plurality of data transactions associated with at least one device, each data transaction having a value indicative of the device's data usage of a communication resource associated with an application each data transaction generated based on, a plurality of data packets from a data stream between at least two computers, and extracted data packet information associated with each of the plurality of data packets;
   accessing a cost record indicative of a cost associated with the communication resource;
   comparing the value of a first one and a second one of the plurality of data transactions to the cost record to determine a first and a second allocated cost respectively for the first one and the second one of the plurality of data transactions wherein based upon a source address, destination address or IP address or combinations thereof and the extracted data packet information, the first and second data transactions indicates a business data usage and are each associated with a different one of a division, a group, an individual within a company or entity, and an individual outside the company or entity;

allocating the first and second allocated costs to different accounts thereby causing usage via the application to be allocated to the different accounts.

15. The method of claim 14 wherein said comparing step includes comparing the value of each of the plurality of data transactions to the cost record to determine an allocated cost for each of the plurality of data transactions.

16. The method of claim 14 further comprising further comprising associating at least one of the first and second allocated costs with an account associated with a third party other than the enterprise associated with the device.

17. The method of claim 14 further comprising:
determining an allocated cost associated with each of the at least one device; and
associating an account identifier with each allocated cost.

18. The method of claim 14 wherein said accessed data includes a third data transaction which indicates a personal data usage, said software comparing the cost record to the third data transaction to determine a third portion of the cost attributed to the device based on the value associated with the third data transaction, said software further allocating the third portion of the cost to an account different than those accounts associated with the first and second data transactions.

19. The method of claim 14 further comprising:
wherein at least one data transaction is associated with data usage of a cloud computing resource.

20. The method of claim 14 further comprising:
associating the first or the second allocated cost with a group within an entity in order to charge the first or second allocated cost to the group, wherein the group is associated with a plurality of devices.

21. The system of claim 14 wherein the different accounts are each associated with one or more of the group consisting of: credit card information, bank account information, and online payment information.

* * * * *